July 23, 1968 R. T. MURRAY 3,393,891
ASSEMBLY LICENSE LAMP AND PLATE HOLDER
Filed Aug. 2, 1966 2 Sheets-Sheet 1

Inventor:
Robert T. Murray,
by Gordon Needham
Atty.

July 23, 1968 R. T. MURRAY 3,393,891
ASSEMBLY LICENSE LAMP AND PLATE HOLDER
Filed Aug. 2, 1966 2 Sheets-Sheet 2
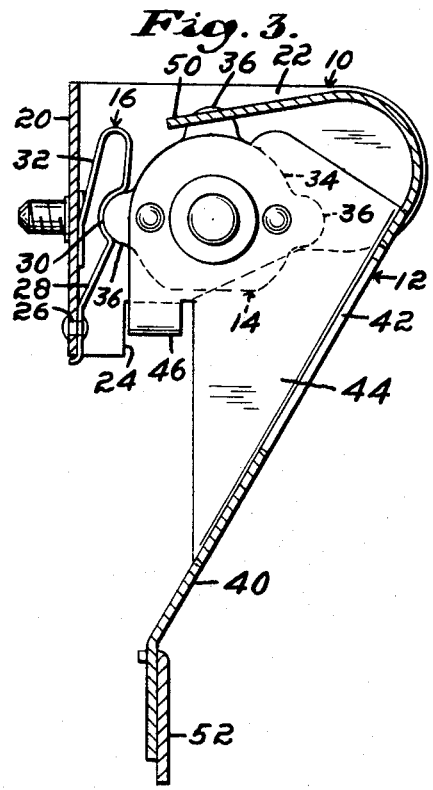
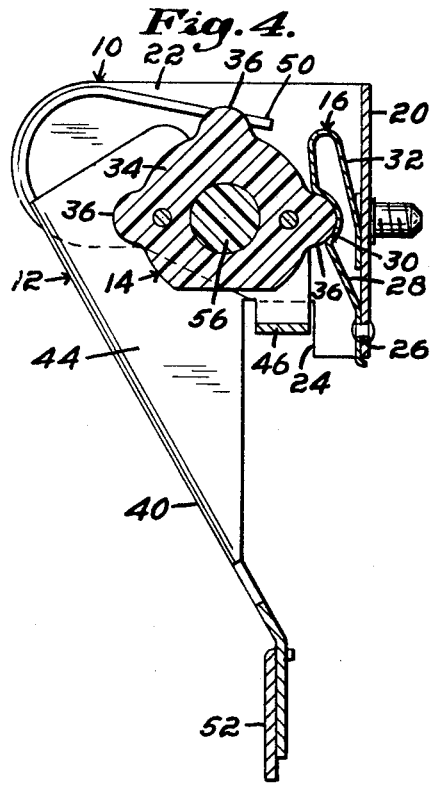
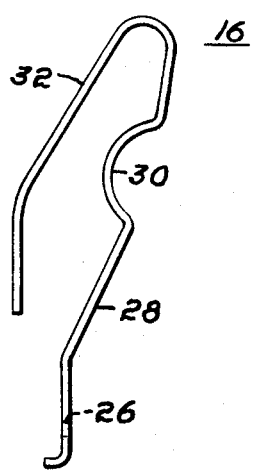
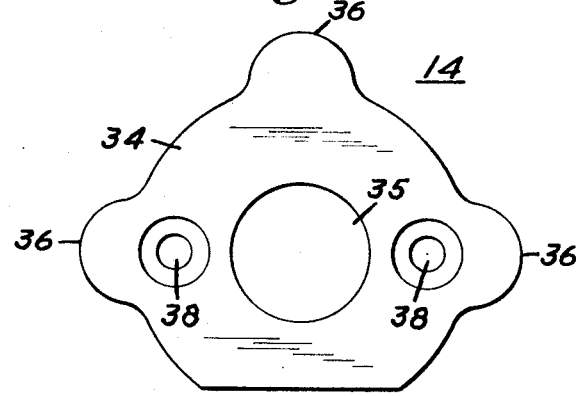
Inventor.
Robert T. Murray
by Gordon Needleman
Atty.

3,393,891
ASSEMBLY LICENSE LAMP AND
PLATE HOLDER
Robert T. Murray, Norfolk, Mass., assignor to United-Carr Incorporated, Boston, Mass., a corporation of Delaware
Filed Aug. 2, 1966, Ser. No. 569,736
5 Claims. (Cl. 248—291)

ABSTRACT OF THE DISCLOSURE

This invention relates to a mounting assembly which is of general utility, but is particularly useful in mounting a license plate and lamp on the tail gate of a vehicle so that the plate will be viewable and illuminated in either the raised or lowered position of the tail gate. The mounting assembly has a fixed bracket with a movable bracket rotatably mounted partially within the fixed bracket. The fixed bracket also carries compound spring elements which engage cam elements carried by the movable bracket to lock the latter in its adjusted positions.

---

This invention relates generally to mounting assemblies and more specifically to a license lamp and plate mounting assembly.

An object of the present invention is to provide a license lamp and license plate mounting assembly having two fixed position points and means of moving the assembly from one position point to the other.

Another object of the present invention is to provide a mounting assembly which will maintain a constant distance, and angular location between the lamp and license plate, and a constant amount of light across the license plate.

Another object of the invention is to provide a mounting assembly which may be moved by one hand from one position to another and which has a locking device which may be varied to increase locking and unlocking pressures.

Still a further object of the invention is to provide a license lamp and plate mounting assembly including positive mechanical stops.

Other objects of the invention will, in part, be obvious and will, in part, appear hereinafter.

In the old art, the assembly was mounted on a bolt which pivoted on a housing and which was stopped in varied positions by the tightening of a wing nut assembled to the bolt.

In the drawings:

FIG. 3 is a section taken on line 3—3 of FIG. 1;

FIG. 4 is a section taken on line 4—4 of FIG. 1;

FIG. 5 is a side elevation of the cam lock spring and

FIG. 6 is a side elevation of the cam element.

Figure 1:
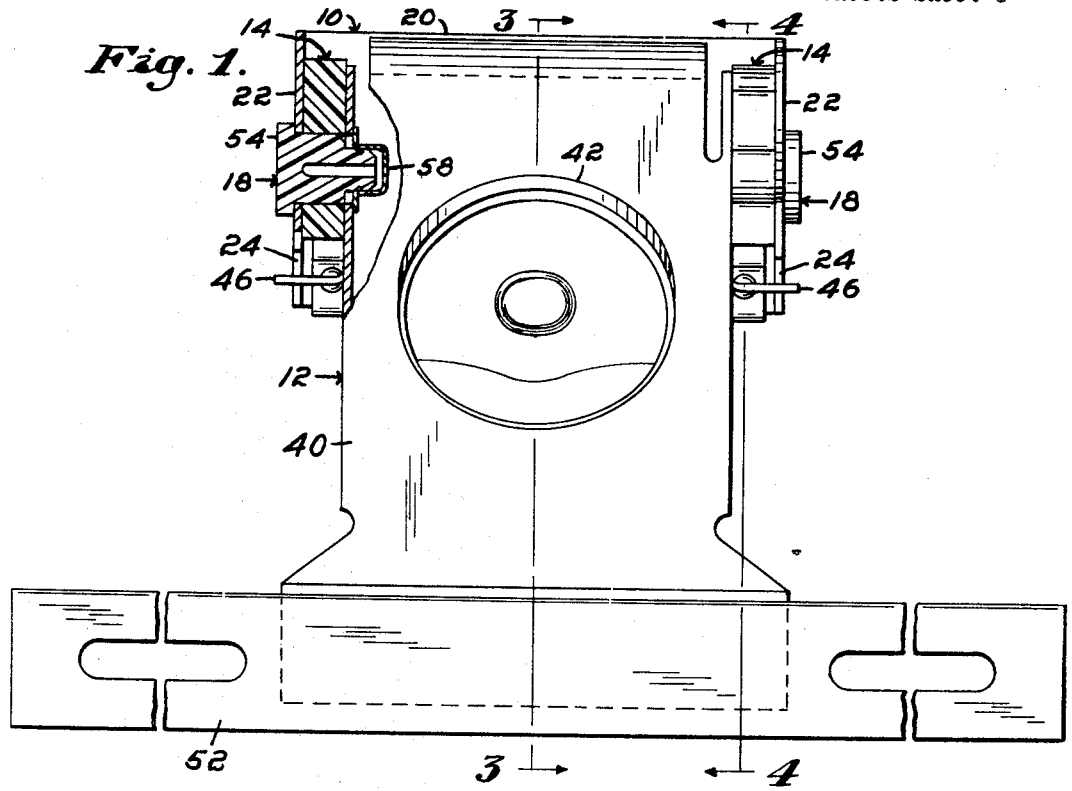
FIG. 1 is a front elevation, partly in section, of the mounting assembly.
Figure 2:
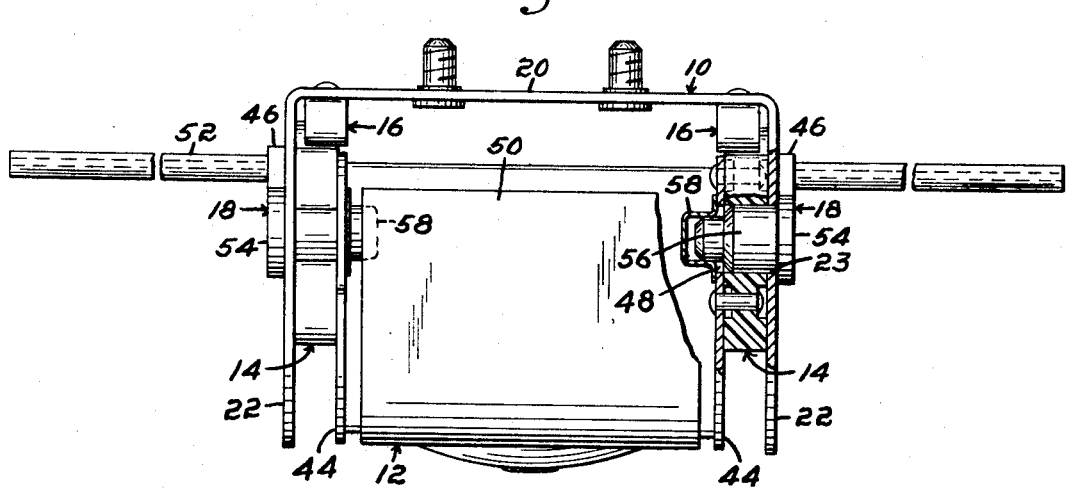
FIG. 2 is a top plan view, partly in section, of the mounting assembly shown in FIG. 1.

In the drawings there is shown a license lamp and license plate mounting bracket assembly which comprises a mounting bracket 10, a movable bracket 12, a pair of cam elements 14, a pair of cam lock springs 16, and a pair of pivotal studs 18.

The mounting bracket assembly comprises the cam lock springs 16 and the mounting bracket 10 which has a base portion 20 substantially rectangular in configuration and has its terminal ends bent at right angles to provide a pair of spaced wing portions 22. Each of the wing portions 22 includes a shoulder 24, in close proximity to the base portion 20, which acts as a stop means and an engagement aperture 23. A pair of apertures are formed through the base portion 20 spaced from each other and having their centers on a mid-line of the length thereof.

Each of the cam lock springs 16 is formed from a flat piece of carbon steel bent generally into a U-shape, having a first arm 28 with its free terminal end bent at right angles to provide an anti-rotational means and having an aperture 26 formed in close proximity to the bent terminal end, an arc shaped recess 30 formed transversely of the first arm 28 a predetermined distance from the bight portion of the cam lock spring 16. A second arm 32 extends from the bight portion in spaced relation to the first arm 28 as shown in FIG. 5. A portion of the second arm 32 is adapted to bear against the base portion 20. If desired, the second arm 32 may be eliminated. Each of the cam lock springs 16 is engaged to the base portion 20 transversely of the long side thereof by rivets passed through the apertures 26 and through a hole formed in the base portion 20. In a rest position, the first arm 28 extends out into the area between the wing portions 22 with the recesses 30 facing the same general direction as that toward which the wing portions 22 extend.

The cam element 14 comprises a cylindrical support portion 34 having a section removed and having lobes 36 extending therefrom and having an engagement hole 35 formed centrally therethrough. Each of the lobes 36 is spaced from the other around the periphery of the support portion 34 and two of the lobes 36 are in opposed relation to each other and a hole 38 is formed through the support portion 34 proximate the root of each of the opposed lobes 36.

The movable bracket 12 comprises a generally rectangular platform 40 having a lamp aperture 42 formed therethrough. A side portion 44 extends from each side edge of the platform 40. The side portions 44 are in parallel relation with each other and each includes a stop portion 46 which extends outwardly away from the side portion 44. An opening 48 is formed through each of the side portions 44 which have a common axis. One end of the platform 40 is bent back on itself to provide a cover portion 50, while the other end has means of engaging a license plate holder 52 which is fixed in position by riveting or other well-known means.

The cam element 14 is attached to the outside of each side portion 44 of the movable bracket 12 with its flat side in close proximity to the stop portion 46 and its lobes 36 extending beyond the peripheral edge of the side portion 44 in a predetermined relation to the cam lock springs 16. The holes 38 of the cam element 14 and the openings 48 of the movable bracket 12 have common axes.

The mounting bracket assembly, which includes the mounting bracket 10 and the cam lock spring 16, is engaged to be assembly of the cam element 14 and the movable bracket 12 through the use of the pivotal studs 18. The apertures formed in the cam element 14 and the side portions 44 are lined up with the holes in the wing portions 22 of the mounting bracket 10 with the side portions 44 of the movable bracket 12 between the wing portions 22 and a pivotal stud 18 is positioned with its head 54 butted against the outer surface of the wing portion 22 and its shank 56 passed through the engagement aperture 23, formed in the wing portion 22, then through the engagement hole 35 formed in the cam element 14, at which point the shank 56 is chamfered to a terminal end of lesser diameter than the remaining portion of the shank 56 which is passed through the opening 48 in the side portion 44 and is then engaged with a push nut 58.

The license lamp and plate-mounting bracket assembly is mounted to the external surface of a vehicle tailgate through the base portion 20 of the mounting bracket 10 by means well known in the art which will place the base portion 20 in parallel relation to the tailgate. With the tailgate in an upright position, the stop portions 46 are in close proximity to the shoulder 24 and the first lobe 36 is engaged within the recess 30 of the cam lock spring 16. The license plate holder 52 is in spaced parallel relation to the plane of the tailgate.

If the tailgate were to be lowered placing it in spaced parallel relation to the road, the license plate holder 52 can be moved through an arc of 90° placing the shoulders 24 in perpendicular spaced relation to the tailgate. The stop portions 46 come in close proximity to the free terminal end of the wing portions 22 while the first lobe 36 is disengaged from the recess 30 and the second lobe 36a engages the recess 30. As the first lobe 36 leaves the recess 30 the first arm 28 of the cam lock spring 16 is moved toward the base portion 20 and then flexed to a central position and again flexed by the second lobe 36 as it engages the first arm 28 and retains a predetermined amount of pressure when it is pivotally engaged in the recess 30.

With reference to the foregoing description it is to be understood that what has been disclosed herein represents only a single embodiment of the invention and is to be construed as illustrative rather than restrictive in nature and that the invention is best described by the following claims.

What is claimed is:

1. A mounting assembly comprising a fixed bracket having a base portion and a pair of wings extending from said base portion in spaced relation to each other, at least one flexible compound cam lock spring engaged to said fixed bracket, a movable bracket having a platform, a pair of side portions extending from said platform in spaced relation to each other, at least one cam element attached to one of said side portions on an outer surface thereof, said side portions lying between said wing portions and said cam element movably engaging said compound cam lock spring, said compound cam lock spring lying between said cam element and said fixed bracket.

2. A mounting assembly as set forth in claim 1 wherein there are two cam elements, one attached to each side portion on an outer surface thereof and at least two cam lock springs engaged to said base portion, said cam lock springs being spaced from each other, said movable bracket being movable in relation to said fixed bracket and each of said cam elements engaging a different cam lock.

3. A mounting assembly as set forth in claim 2 wherein each of said cam elements is sandwiched between a wing and a side portion.

4. A mounting assembly as set forth in claim 3 wherein each of said cam elements comprises a support portion having at least two lobes extending from the periphery thereof, each of said lobes adapted to engage said cam lock spring.

5. A mounting assembly as set forth in claim 4 wherein each of said cam lock springs has one portion attached to said base portion and a portion spaced from said base portion and having means of engaging said lobes.

References Cited

UNITED STATES PATENTS 2,435,816   2/1948   Anderson.

FOREIGN PATENTS 602,676   6/1948   Great Britain.

ROY D. FRAZIER, *Primary Examiner.*

J. F. FOSS, *Assistant Examiner.*